(No Model.)
C. B. HARKNESS.
BICYCLE SUPPORT.
No. 599,446. Patented Feb. 22, 1898.
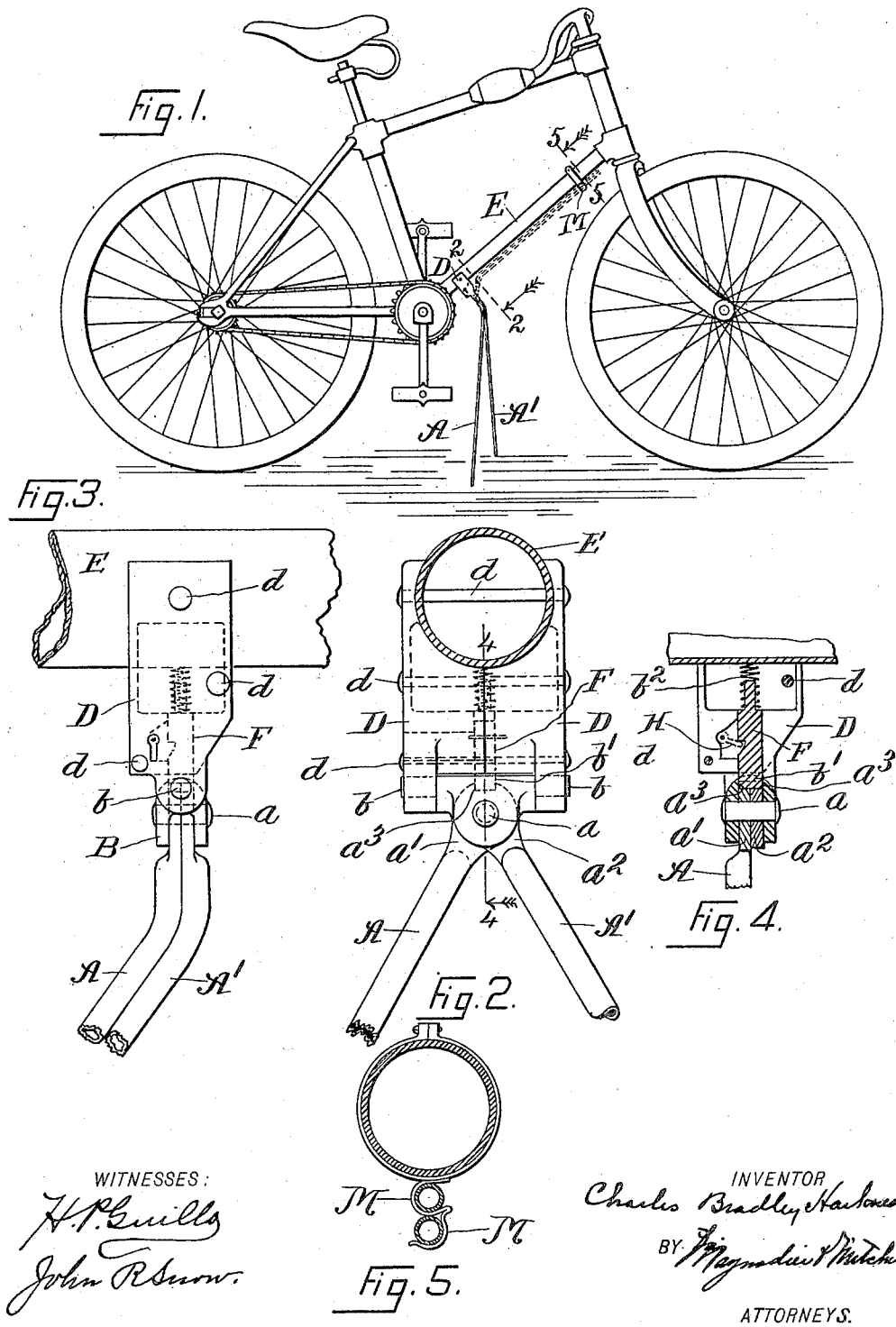
WITNESSES:
INVENTOR
Charles Bradley Harkness
BY
ATTORNEYS.

UNITED STATES PATENT OFFICE.

CHARLES B. HARKNESS, OF READING, MASSACHUSETTS.

BICYCLE-SUPPORT.

SPECIFICATION forming part of Letters Patent No. 599,446, dated February 22, 1898.

Application filed February 23, 1897. Serial No. 624,568. (No model.)

*To all whom it may concern:*

Be it known that I, CHARLES BRADLEY HARKNESS, of Reading, in the county of Middlesex and State of Massachusetts, have invented a new and useful Support for Bicycles, of which the following is a specification, reference being had to the accompanying drawings, in which—

Figure 1 is an elevation of the bicycle with my support attached. Fig. 2 is a section on line 2 2 of Fig. 1. Fig. 3 is a side view of Fig. 2. Fig. 4 is a section on line 4 4 of Fig. 2, and Fig. 5 is a section on line 5 5 of Fig. 1.

My invention is a support for bicycles made up of a casing which serves to connect the support to the frame of the bicycle and which carries a locking-bolt and a supporting leg or legs connected to the casing by a double hinge, so that the leg or legs have a motion in planes lengthwise and crosswise of the bicycle, and so organized that when in their supporting position the locking-bolt will engage both parts of the double hinge and prevent movement of the leg or legs in either plane, the object being to make a support which will serve to hold the bicycle in an upright position and also serve to prevent the machines from being ridden while the legs are in that position.

As shown in the drawings, my support is made up of the legs A A', pivotally connected to each other by bolt $a$, passing through the upper ends $a'$ $a^2$ of the legs A A'. The ends $a'$ $a^2$ are secured by the bolt $a$ within a recess in the yoke B, which yoke is provided with trunnions $b\,b$, which turn in the casing, made up of parts D D, which are fastened together, as by rivets $d\,d\,d$, and whose upper ends clamp or are secured to the tube E of the bicycle. The bolt F works in a recess formed in the casing D D and is adapted to enter the bolt-holes $b'$ in the top of yoke B, and also into recesses $a^3$ in ends $a'$ $a^2$, and is thrown forward and held in those recesses by the spring $b^2$, thus locking the legs and yoke into the position shown in Figs. 1 and 2. The bolt F is raised by a key H, as will be clear from the drawings.

The operation is as follows: When the legs A A' are in the position shown by dotted lines in Fig. 1 and it is desired to use the support, the legs A A' are turned on bolt $a$, and the yoke B and legs A A' are then turned on trunnions $b\,b$ until they come into the position shown in Figs. 1 and 2, when the bolt F enters the recesses $b'$ and $a^3$, locking the yoke and legs in the supporting position and rendering it impossible to ride the bicycle without first lifting the legs A A'.

When the bicycle is to be used, the bolt of the lock is turned back and the legs are pressed together and swung up against the frame of the bicycle, where they are held by the wire loops M M or other suitable means.

What I claim as my invention is—

In a bicycle-support, the combination of a casing D; a locking-bolt F within that casing; yoke B pivoted to that casing and having a perforation for that bolt; legs A A' pivoted within the yoke and having notches in their upper ends to register with perforations in the yoke and receive the bolt when the legs are in their supporting position, all organized to lock the legs in their supporting position, substantially as described.

CHARLES B. HARKNESS.

Witnesses:
 WM. MAYNADIER,
 H. P. GUILLO.